G. D. PARKER.
FRUIT GRADING APPARATUS.
APPLICATION FILED DEC. 9, 1912.
1,092,664.
Patented Apr. 7, 1914.
3 SHEETS—SHEET 3.
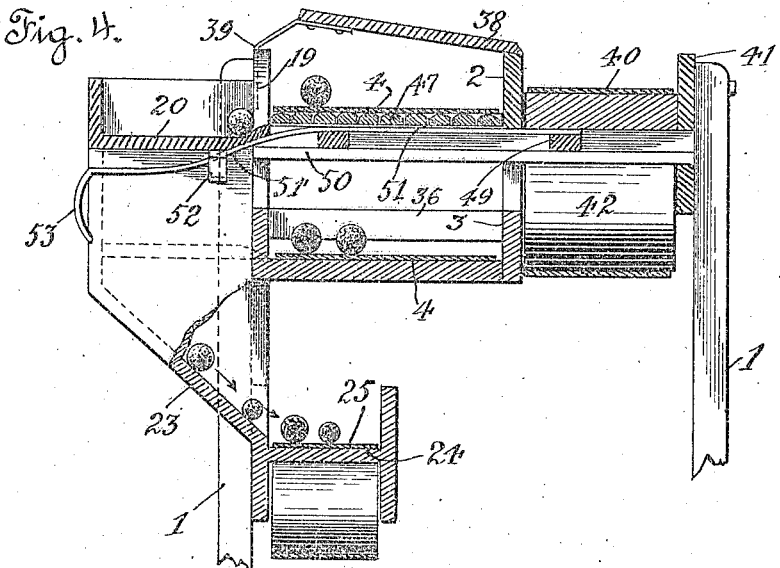
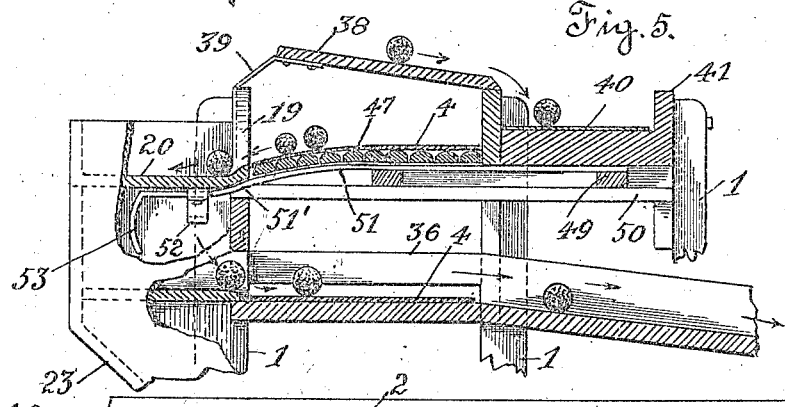
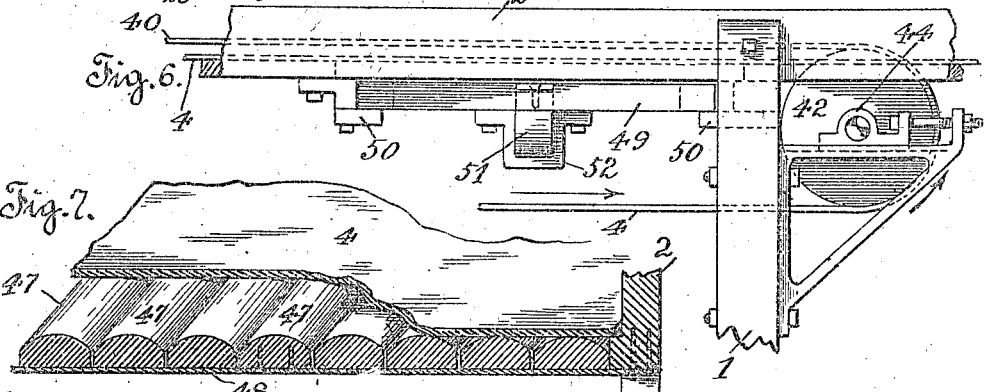
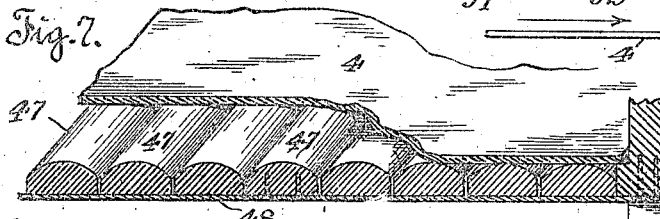
Witnesses,
Inventor,
Geo. D. Parker

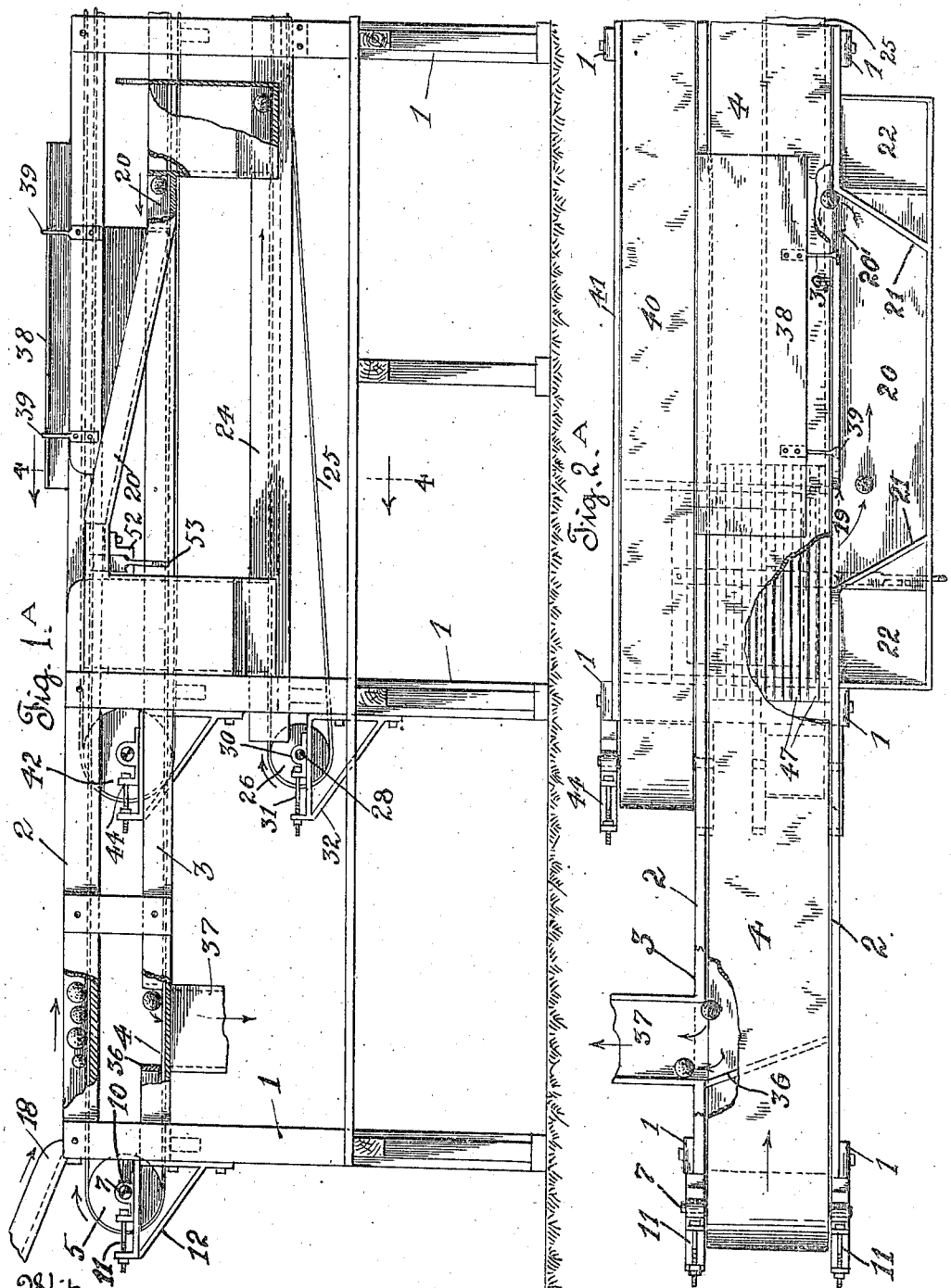

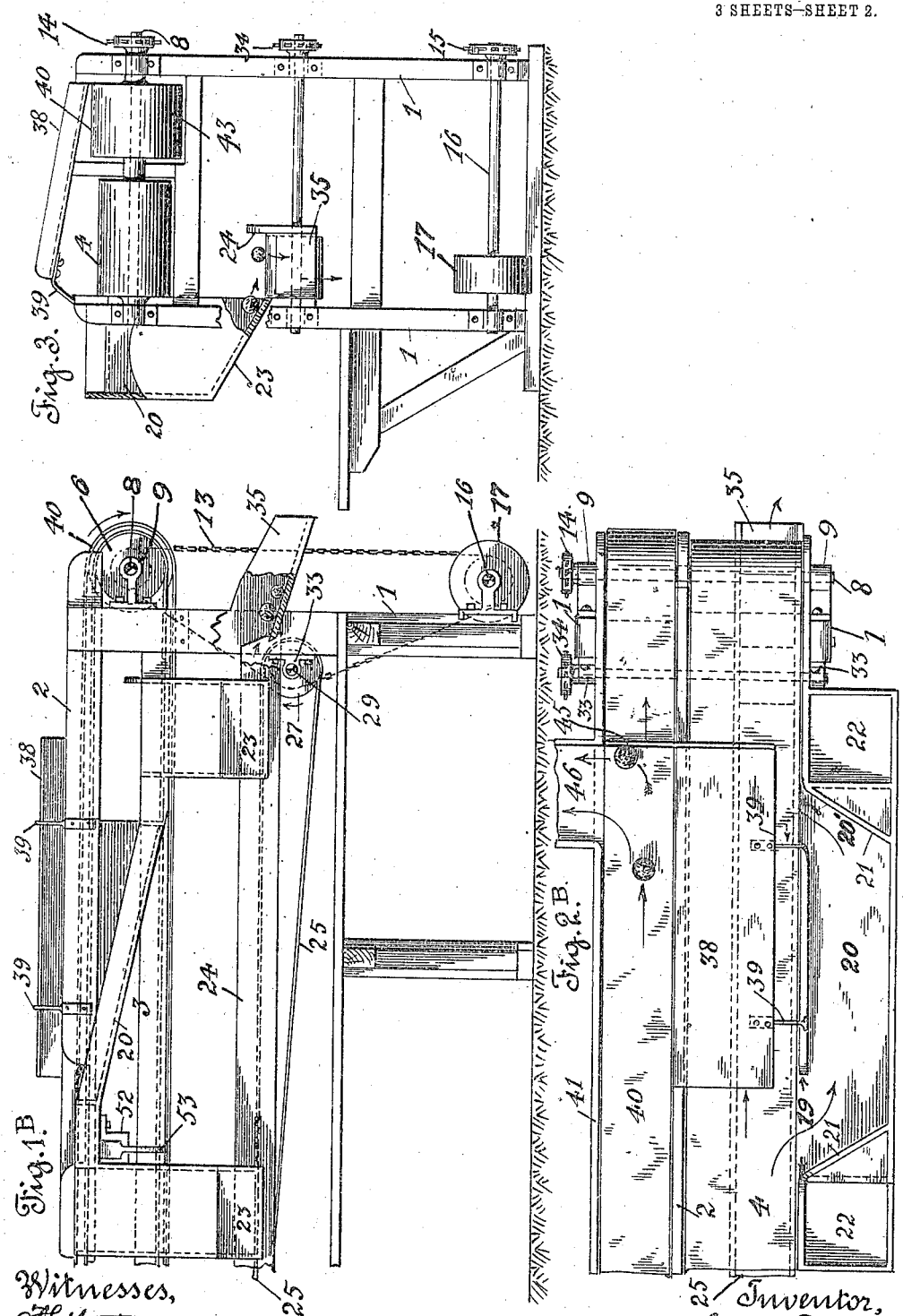

UNITED STATES PATENT OFFICE.

GEORGE D. PARKER, OF RIVERSIDE, CALIFORNIA.

FRUIT-GRADING APPARATUS.

1,092,664.

Specification of Letters Patent.

Patented Apr. 7, 1914.

Application filed December 9, 1912. Serial No. 735,654.

*To all whom it may concern:*

Be it known that I, GEORGE D. PARKER, a citizen of the United States, residing at Riverside, in the county of Riverside and State of California, have invented certain new and useful improvements in Fruit-Grading Apparatus, of which the following is a specification.

The present invention relates to improvements in fruit grading apparatus and more particularly to a type of apparatus employed for the grading of fruit relative to quality rather than to size.

At present it is the practice in grading fruit as to quality to deposit the orchard run of fruit onto an endless belt conveyer, along the side edges of which are stationed operators, who examine the fruit as it is conveyed past them, and separate the different grades from the main body, placing the different grades into separate chutes or bins. The serious objection to the apparatus of this type is that each operator is required to examine the entire amount of fruit as it passes on the conveyer, in order to remove that portion which he sorts or grades, and the capacity of the conveyer being enough for the entire force of operators, considerable time is lost in several operators examining the same fruit before it is finally removed from the conveyer, to permit their attention to be directed to other fruit and the grading thereof. In the above type of apparatus the operators adjacent the receiving end of the conveyer are compelled to examine a greater amount of fruit than the others and thus the work of grading the fruit is not equalized between the several operators.

The principal object of my invention is to provide an apparatus of the endless conveyer type, with means whereby each operator may direct, into a distributing tray for grading, a portion of the fruit carried by the conveyer, thus avoiding the necessity of examining the entire amount of fruit as it is transported by the endless conveyer, and expediting the work of grading by providing each operator with a constant supply of fruit to be graded, which has not been examined by the operator adjacent the receiving end of the conveyer.

Further and important objects are to provide an apparatus which is simple in construction, easy of operation, and by the use of which an operator may more thoroughly grade a larger volume of fruit than has heretofore been possible.

With the above mentioned and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the appended claims, may be resorted to without departing from the spirit or sacrificing any advantages of the invention.

To more fully comprehend the invention, reference should be had to the accompanying sheets of drawings forming a part of this application, and wherein—

Figure 1ᴬ is a side elevation of the forward or receiving portion of my improved grader, disclosing one of the inclined distributing trays and several of the endless conveyer belts. Fig. 1ᴮ is a side elevation of the rear portion of th apparatus disclosing another of the distributing trays, several of the endless conveyer belts and the driving mechanism therefor. Fig. 2ᴬ is a top plan view of Fig. 1ᴬ, disclosing the receiving belt, one of the distributing trays, and the flexible support for directing the flow of fruit from the conveyer belt into the distributing platform. Fig. 2ᴮ is a top plan view of Fig. 1ᴮ, disclosing another of the distributing trays. Fig. 3 is a view of the rear end of the apparatus, disclosing the several endless conveyers and the drive means therefor. Fig. 4 is an enlarged broken cross sectional view taken on line 4—4 of Fig. 1ᴬ, viewed in the direction of the arrow, disclosing one of the grading trays, the communication between the endless conveyer and the tray, the flexible support for the endless conveyer and the sliding frame for regulating the flow of fruit into the tray. Fig. 5 is a broken cross sectional view similar to Fig. 4 with the sliding frame in an inward position, and disclosing the conveyer belt inclined toward the opening in the grading tray for directing the fruit thereinto. Fig. 6 is a broken elevation of Figs. 4 and 5, viewed from the rear of the apparatus, disclosing one of the sliding frames and the manner of mounting the same. Fig. 7 is an enlarged broken detail of the flexible support for one of said conveyers and one of which is placed adjacent each grading tray.

Referring more particularly to the drawings—the reference numeral 1 designates suitable vertical supporting timbers or uprights, the extreme upper ends of which support a substantially horizontal channel or guideway 2, beneath which in spaced relation thereto is also supported a similar channel or guide 3, and in said channels 2 and 3 is adapted to operate an endless conveyer belt 4, which moves in the direction of the arrows—Fig. 1ᴬ, and said belt is supported at its ends by suitable rolls 5 and 6, mounted on shafts 7 and 8, which are journaled in bearings 9 and 10, the bearing 9 being rigidly attached to the supporting timbers 1 at one end of the channels 2 and 3, and the bearing 10 being adjustably supported as at 11 in brackets 12, secured to supporting timbers 1 at the opposite end of the channels 2 and 3.

The conveyer belt 4 is driven in the direction of the arrow—Fig. 1ᴬ, by an endless chain 13 which extends around a sprocket 14 mounted at one end of the shaft 8 and around a corresponding sprocket 15 arranged at one end of a drive shaft 16, which carries a drive pulley 17 adapted to receive its power from any suitable source. It will be observed that by arranging the channels one above the other, and positioning the supporting rolls between the same, at opposite ends thereof, that the endless belt extended around said rolls and positioned within said channels, will provide an endless conveyer for both. The fruit to be graded, the run of the orchard, is delivered onto the endless conveyer belt 4 in the channel 2 by an inclined chute 18 preferably arranged above the roll 6.

The side wall of the channel 2 is provided at spaced intervals throughout its length with openings 19 which communicate with the upper ends of inclined lateral runways 20 hereinafter termed distributing trays, the lower ends of which communicate with the channel 3 through openings 20′ in the sides thereof. Arranged at the opposite ends of the distributing trays 20, but separated therefrom by the partitions 21, are open topped wells 22, the lower ends of which are inclined as at 23 and communicate with a horizontal channel 24, supported by the uprights 1 and preferably arranged below the channel 3, and mounted in said channel 24 is a conveyer 25, in the form of an endless belt, which is supported at its ends and extends around suitable rolls 26 and 27, which are respectively mounted on shafts 28 and 29, the shaft 28 being journaled in bearings 30 adjustably mounted, as at 31, on brackets 32, secured to the uprights 1, and the shaft 29 is rotatably mounted in journals 33 and is provided on its end with a sprocket 34, which contacts with and is driven in the direction of the arrow Fig. 1ᴮ by the chain 13.

The quality of fruit which is deposited on the conveyer 25 is carried by the movement thereof and discharged therefrom through a chute 35 into any suitable apparatus, such as a sizer.

The quality of fruit which is passed through the openings 20′ into the channel 3 is conveyed by the belt 4 in the direction of the arrow—Fig. 1ᴬ, until it strikes the wall 36 extending diagonally across the channel, in spaced relation above the belt, the wall directing the fruit from the channel into an inclined chute 37 which discharges into any suitable apparatus such as a sizer. Arranged adjacent each distributing tray 20 and extending across the channel 2 is an inclined runway 38, one edge of which is supported by brackets 39 and the opposite edge of which rests on the outer side edge of the channel 2. The runways are adapted to direct another quality of fruit, other than that quality which is passed through openings 20′, and which is deposited into wells 22, onto an endless conveyer 40 in the form of a belt, which operates in a channel 41 extending parallel with the channel 2, and said belt extends, at its ends around rolls 42 and 43, the roll 42 being mounted on adjustable bearings 44, and the roll 43 being carried by the shaft 8. The fruit as it is conveyed by the belt in the direction of the arrow—Fig. 2ᴮ, is deflected from the belt by a wall 45 extending transversely of the channel, in spaced relation above the belt, into a chute 46 from which it is conveyed into any suitable apparatus, such as a sizer.

The mechanism for regulating the flow of fruit from the conveyer 4, through the openings 19 into the distributing trays 20, is constructed in the following manner: The lower solid or floor portion of the channel 2 is interrupted or cut away adjacent each opening 19, and inserted in each of said interrupted portions is a flexible bottom or flooring composed of a plurality of semi-circular strips 47 extending longitudinally of the channel, and connected on their underside in any suitable manner, by a piece of flexible material or fabric 48, one edge of which is secured to the underside of the edge of said channel in any suitable manner, as disclosed in Fig. 7. Positioned below each section of flexible flooring is a frame 49, slidably mounted in guides 50, and secured to the upper surface of each of said frames is an operating rod 51, of suitable flexible strap material downwardly curved at its outer end as at 51′ and which extends through a guide 52 mounted on the underside of the distributing tray 20, and said rod is provided on its outer end with an operating handle 53. It will be apparent by observing Fig. 4, that the frame 49 when in its forwardmost position beneath the flexible flooring 47, maintains the same in a substantially horizontal position, flush with the solid floor portion of the channel, and that only the fruit which is at the extreme edge of the belt 4 will pass through the openings 19, into the trays 20. The frame when pushed inwardly away from under the flooring 47, as in Fig. 5, allows the same to drop or sag onto the curved portion 51' of the arm 51, which in turn permits that portion of the belt passing over the frame to drop or sag toward the opening 19, which will direct a greater amount of fruit into the opening than if the belt were maintained in a horizontal position.

The operation of the apparatus is as follows: The structure being assembled as in the drawings, with the conveyers operating in the direction of the arrows, and an operator stationed on the platform adjacent each distributing tray 20; the fruit to be graded is deposited on the conveyer 4 from the chute 18 and the operator at each distributing tray adjusts the frame 49 associated therewith, to permit the flow of the required amount of fruit into each distributing tray. As the fruit collects in the trays 20, the operators examine the same as to quality, removing the largest and most perfect termed "table fancy", depositing the same on the inclines 38, which direct it to the conveyer 40, by which it is carried to the chute 46 which discharges it from the apparatus. Another grade of fruit termed "culls" is removed from the trays 20 and is deposited in the wells 22 onto the belt 25, by which it is carried to the chute 35 and discharged from the apparatus. Another quality of fruit other than the "table fancy" and "culls" is permitted to roll down the incline of the tray 20, through the opening 20' onto the conveyer 4, of the channel 3, and is discharged through the chute 37, this quality is termed "choice". Should the fruit to be graded enter a tray faster than it can be handled or graded by the operator, the operator in charge of the tray will slide the frame 49 under the flexible flooring which will maintain the conveyer in a more horizontal position as it passes the opening leading to the tray, consequently a lesser quantity of fruit will be directed through the opening into the tray than if the conveyer is inclined toward the same.

It will be observed that a quantity of fruit is directed from the main conveyer into each tray 20, and that each operator examines only that fruit in the tray at which he is stationed, and that the supply of fruit from the main conveyer to the distributing trays is under control of the operator.

Having thus described my invention what I claim as new and desire to secure by Letters Patent is—

1. In an apparatus of the class described, the combination with a runway, a flexible conveyer mounted therein and adapted to be supplied with fruit to be graded, a distributing tray associated with said conveyer, an opening in the side wall of said runway and adapted to be supplied with fruit from said conveyer, and flexible means associated with said runway for permitting said conveyer to incline toward said tray as it is propelled past the same.

2. In an apparatus of the class described, the combination of a runway, a flexible conveyer mounted therein and adapted to be supplied with fruit to be graded, means for operating said conveyer relative to said runway, said runway provided in one of its side walls with a plurality of spaced openings, a distributing tray associated with each of said openings and adapted to be supplied with fruit from said conveyer, and flexible means associated with said runway adjacent each of said openings for permitting said conveyer to incline toward said trays as propelled past the same.

3. In an apparatus of the class described, the combination with a fruit runway, an endless flexible conveyer mounted therein and adapted to be supplied with fruit to be graded, a plurality of distributing trays communicating with said conveyer through openings in the side of said runway formed at spaced intervals throughout its length, said trays adapted to be supplied with fruit from said conveyer, flexible means associated with said conveyer for permitting the same to incline toward said trays as propelled past the same, and means for controlling the inclination of said flexible means.

4. In an apparatus of the class described, the combination with a fruit guideway provided with a plurality of laterally disposed discharge outlets for the fruit, an endless conveyer for the fruit and working in said guideway, a distributing tray communicating with said conveyer at each of said discharge outlets and adapted to be supplied with fruit from said conveyer, flexible means for permitting said conveyer to incline toward said trays, as it is propelled past the same to regulate the flow of fruit from said conveyer into each of said trays, a plurality of conveyers for receiving the fruit after the same has been graded, and channels associated with each of said trays and communicating with the respective conveyers for receiving and directing the graded fruit onto said conveyers.

5. In a fruit grading or sorting apparatus, the combination with a fruit guideway provided in its side wall at spaced intervals with a laterally disposed discharge outlet for the fruit, and said guideway being further provided in its base adjacent each discharge outlet with a cutout portion, a flexible endless conveyer for the fruit working in said guideway, said conveyer being substantially horizontal in a plane transverse to its line of travel, means for imparting a longitudinal travel to said conveyer, and devices coöperating with each of said cutout portions for varying the inclination laterally of the conveyer adjacent each discharge outlet for regulating the outflow of the fruit through the respective discharge outlets.

6. In an apparatus of the class described, the combination with a conveyer adapted to be supplied with fruit to be graded, a plurality of distributing trays communicating with said conveyer at spaced intervals throughout its length, a flexible support for said conveyer adjacent each of said distributing trays and adapted to be inclined toward said trays, and means for controlling the inclination of said flexible supports.

7. In an apparatus of the class described, the combination with a conveyer adapted to be supplied with fruit to be graded, a plurality of distributing trays communicating with said conveyer at spaced intervals throughout its length, a flexible support for said conveyer adjacent each of said distributing trays and adapted to be inclined toward said trays, and separate means associated with each flexible support for independently controlling the inclination thereof.

8. In an apparatus of the class described, the combination with a flexible endless conveyer adapted to be supplied with fruit to be graded, means for operating said conveyer, a plurality of distributing trays communicating with said conveyer at spaced intervals throughout its length, and flexible means for permitting said conveyer to incline toward said trays as it is propelled past the same.

9. In an apparatus of the class described, the combination with a flexible endless conveyer for receiving fruit to be graded, a plurality of distributing trays communicating with said conveyer at spaced intervals throughout its length and adapted to receive fruit from said conveyer, a plurality of conveyers common to all of said trays for receiving the fruit after the same has been graded, a discharge for each of said conveyers, means for regulating the flow of fruit from the first mentioned conveyer into said trays, and channels associated with each of said trays and communicating with corresponding conveyers for receiving the graded fruit from said trays and directing the same onto said conveyers.

10. In a fruit grading or sorting apparatus, the combination with a fruit guide way provided with a plurality of laterally disposed discharge outlets for the fruit, of an endless conveyer for the fruit working in said guide way, said conveyer being substantially horizontal in a plane transverse to its line of travel, means for imparting longitudinal travel to said conveyer, and flexible devices associated with each of said outlets for independently varying the inclination laterally of the conveyer adjacent each discharge outlet for regulating the outflow of the fruit through the respective discharge outlets.

11. In an apparatus of the class described, the combination with a fruit runway having an open section in the bottom thereof intermediate the length of the runway, and provided with a transversely disposed fruit outlet adjacent said cutout section, a flexible covering for the cutout bottom section of the runway, a transversely slidable support for said flexible covering, a conveyer belt working within the fruit runway, and a distributing tray arranged parallel to the fruit runway and at one side thereof, said tray communicating with the transverse cutout of the said runway.

In testimony whereof I have signed my name to this specification in the presence of two subscribing witnesses.

GEORGE D. PARKER.

Witnesses:
S. A. MARKS,
W. P. SHEPHERD.